(12) United States Patent
Alba Pinto et al.

(10) Patent No.: US 7,861,062 B2
(45) Date of Patent: Dec. 28, 2010

(54) DATA PROCESSING DEVICE WITH INSTRUCTION CONTROLLED CLOCK SPEED

(75) Inventors: Carlos Antonio Alba Pinto, Eindhoven (NL); Balakrishnan Srinivasan, Eindhoven (NL); Ramanathan Sethuraman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 807 days.

(21) Appl. No.: 10/561,454

(22) PCT Filed: Jun. 22, 2004

(86) PCT No.: PCT/IB2004/050964

§ 371 (c)(1),
(2), (4) Date: Dec. 20, 2005

(87) PCT Pub. No.: WO2004/114128

PCT Pub. Date: Dec. 29, 2004

(65) Prior Publication Data

US 2008/0133880 A1 Jun. 5, 2008

(30) Foreign Application Priority Data

Jun. 25, 2003 (EP) .................. 03101877

(51) Int. Cl.
*G06F 9/30* (2006.01)
(52) U.S. Cl. ..................................... 712/214
(58) Field of Classification Search .......... 712/24, 712/214
See application file for complete search history.

(56) References Cited

U.S. PATENT DOCUMENTS

| 5,829,031 | A | 10/1998 | Lynch |
| 5,923,871 | A | 7/1999 | Gorshtein |
| 6,367,003 | B1 * | 4/2002 | Davis .................... 712/208 |
| 6,418,527 | B1 * | 7/2002 | Rozenshein et al. ......... 712/208 |
| 6,442,701 | B1 | 8/2002 | Hurd |

(Continued)

FOREIGN PATENT DOCUMENTS

WO    0060457 A1    10/2000

OTHER PUBLICATIONS

Patterson, David, Hennessy, John L. "Computer organization and design: the hardware/software interface" Morgan Kaufmann Publishers, 1998. pp. 466-476.*

(Continued)

*Primary Examiner*—Jacob Petranek (57) ABSTRACT

The data processing device has a plurality of functional units and issues instructions in successive instruction cycles. Instructions of a first type are each intended for one functional unit at a time. An instruction of a second type causes a combination of functional units to respond in the same instruction execution cycle, a result from one functional unit being used by another as part of the execution of the same instruction. Preferably, the device supports alternative operation at a number of different instruction cycle rates, dependent on whether an executed program segment contains instructions of the second type. The fastest instruction cycle rate does not allow execution of the instruction of the second type, because operation by different functional units does not fit within the instruction execution cycle. When possible, the device saves power by switching to a slower clock rate, in which case instructions of the second type are executed to save additional power, by reducing the number of instructions that have to be issued.

10 Claims, 4 Drawing Sheets

U.S. PATENT DOCUMENTS

| | | | |
|---|---|---|---|
| 6,457,131 B2 * | 9/2002 | Kuemerle | 713/300 |
| 6,487,675 B2 * | 11/2002 | Sager et al. | 713/501 |
| 6,606,700 B1 * | 8/2003 | Sih et al. | 712/35 |
| 2004/0225868 A1 * | 11/2004 | Kim et al. | 712/214 |

OTHER PUBLICATIONS

Jacobson, Quinn et al "Instruction Pre-Processing in Trace Processors" High-Performance Computer Architecture Jan. 9, 1999, pp. 125-129.

* cited by examiner

DATA PROCESSING DEVICE WITH INSTRUCTION CONTROLLED CLOCK SPEED

The invention relates to an instruction controlled data processing device.

PCT patent application No. WO00/60457 discloses a VLIW processing device. A VLIW processing device contains a plurality of functional units that are each capable of executing an instruction in parallel with other functional units. A VLIW processing device processes VLIW instruction words that each generally contain a plurality of instructions for execution in parallel by respective functional units. A VLIW processor has the advantage of enabling high-speed execution of programmed processing tasks, but this advantage is bought at the expense of high memory use and high power consumption. WO00/60457 aims to reduce the instruction memory size needed for programs for VLIW processing devices. For this purpose the processing device composes VLIW instructions in response to instructions in a memory. Thus, an original instruction from memory is translated into a plurality of instructions in a VLIW instruction word, to be executed in parallel with different functional units.

High power consumption is caused, among others, by the need to issue many instructions in parallel and the need to access a register file for each issued instruction. These problems are not addressed by WO00/60457.

Among others, it is an object of the invention to provide for a reduction of power consumption in an instruction controlled processing device.

Among others, it is an object of the invention to provide for a reduction of power consumption in particular in a VLIW processing device.

The device according to the invention is set forth in claim 1. This device contains a group of functional units that are connected in parallel to an issue slot and ports of a register file, for alternatively executing instructions issued from the issue slot with operands from at least one port and writing results to at least one port. In addition to these alternative instructions, the device provides for a combination instruction in response to which more than one functional unit from the group responds, a result from a first one of the functional units being routed to an operand input of a second one of the functional units in response to the combination instruction. The result of the second one of the functional units is used to produce the result of the combination instruction. By using a combination instruction, one can reduce the number of instructions that needs to be issued to the group of functional units during execution of a program for a give task, thereby reducing power consumption. In contrast to WO00/60457, the combination instruction is not split out into multiple instructions that have to be issued separately, but issued in one issue slot. Thus, the device partly goes against the philosophy of VLIW processing, by partly avoiding the need to issue instructions for different functional units in parallel, even though, of course, other instructions may be issued in parallel with the combination instruction in a same VLIW instruction word.

In an embodiment the processing device has a selectable clock rate for instruction cycles. By reducing the clock rate used during execution of processing tasks that do not need a higher clock rate, power consumption is reduced. When a processing task has to be executed at high speed the clock rate is increased up to a maximum at which all individual functional units can just execute the instruction within one instruction cycle. According to one aspect of the invention the device is constructed so that more than one functional unit responds to the combination instruction in the same instruction cycle, acting in series, and the clock rate can be increased to such a high speed that the series execution of the combination instruction no longer fits within one instruction cycle. When the clock rate is increased to such a level, use of the combination instruction is avoided, for example by executing only programs that do not contain combination instructions, or switching between alternative versions of program that do and do not use combination instructions to accomplish the same task respectively, or by translating the combination instructions into instructions executed by different functional units in successive cycles.

In this way, increased power saving an be realized, because when the device executes at a slow clock rate the total number of instructions that has to be issued to execute a processing task can be reduced by combining instructions into a combination instruction, for which the issue slot needs to be active only during one instruction cycle. When the combination instruction does not use up more instruction cycles than normal instructions its use reduces the time needed to execute a program, making it possible to reduce the clock rate even further for a processing task that has to be executed in a specified time interval.

In another embodiment the processing device is a VLIW processor that contains a plurality of functional units to which instructions from an instruction word can be issued in parallel, for execution in parallel. In this embodiment a bypass coupling is provided from a result output of a further functional unit, which receives an instruction in parallel with the group of functional units that receives the combination instruction, to an operand input of the second one of the functional units that responds to the combination instruction and also receives the result of the first one of the functional unit. Preferably, the bypass connection contains no latch for pipelining the execution stage executed by the functional units over multiple instruction cycles. Thus, a VLIW instruction word may be used that contains a combination instruction for one group together with another instruction for a functional unit that delivers an operand used during execution of the combination instruction. As a result at sufficiently low clock speeds fewer instructions need to be issued, while still maintaining sufficient speed.

In a further embodiment execution of the combination instruction may extend over more than one instruction cycle. Thus, the combination instruction can also be executed at clock rates at which series execution does not fit within one instruction cycle. In one embodiment intermediate registers are provided to latch results that are routed from one functional unit to another when both functional units respond to the combination instruction. However, this requires additional power consumption by the register and it splits execution. In another embodiment no register is used between the functional units, making use of wave pipelining to pass results from one functional unit to another in part of an interval that spans more than one instruction cycle.

Figure 1:
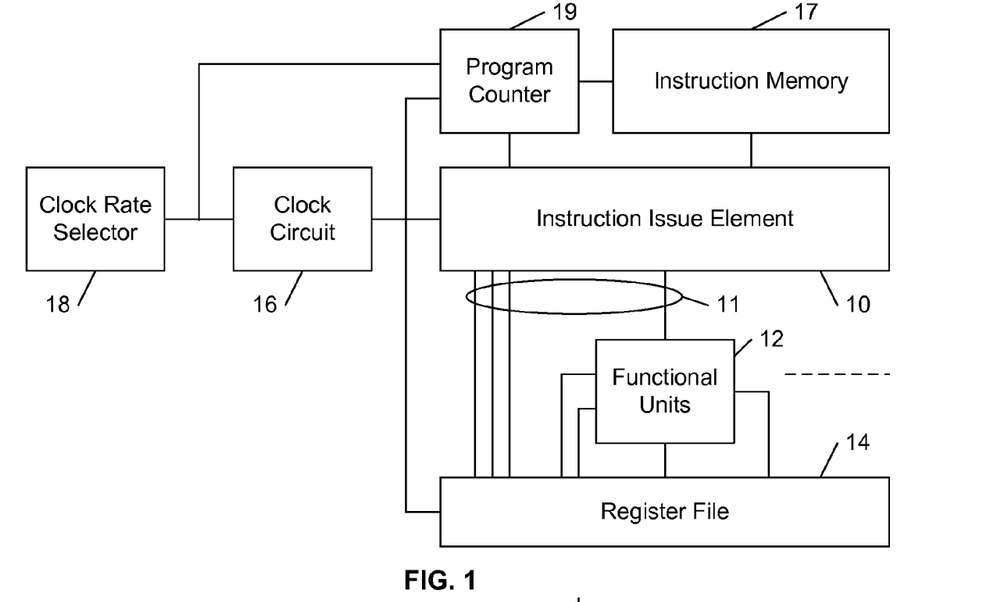
Figure 2:
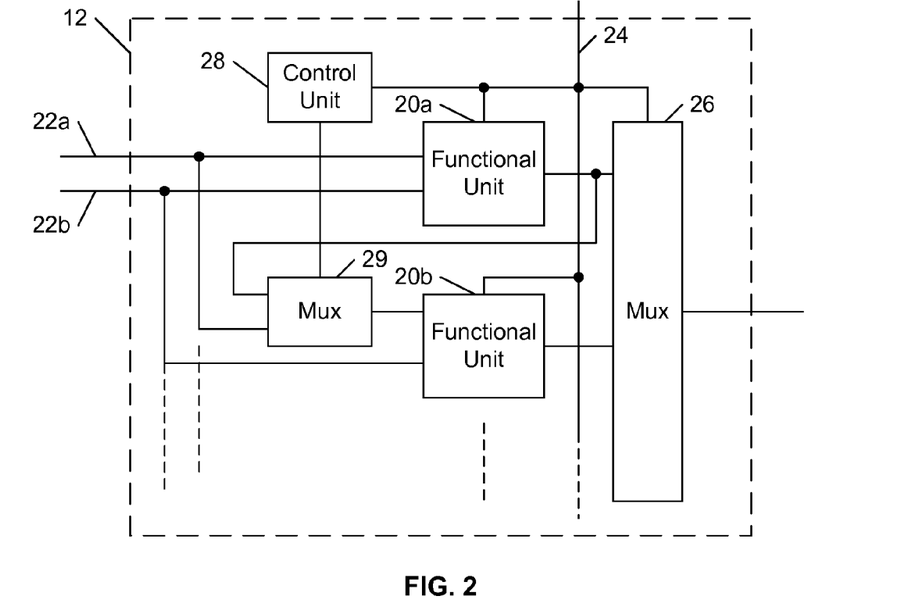
Figure 3A:
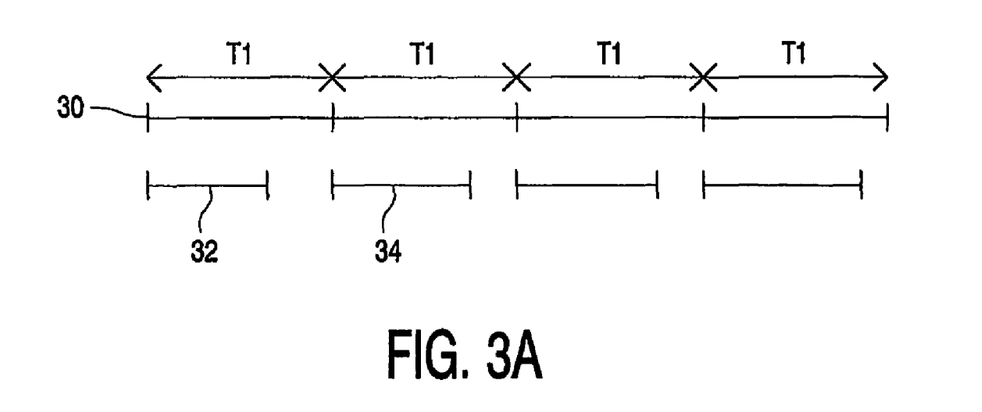
Figure 3B:
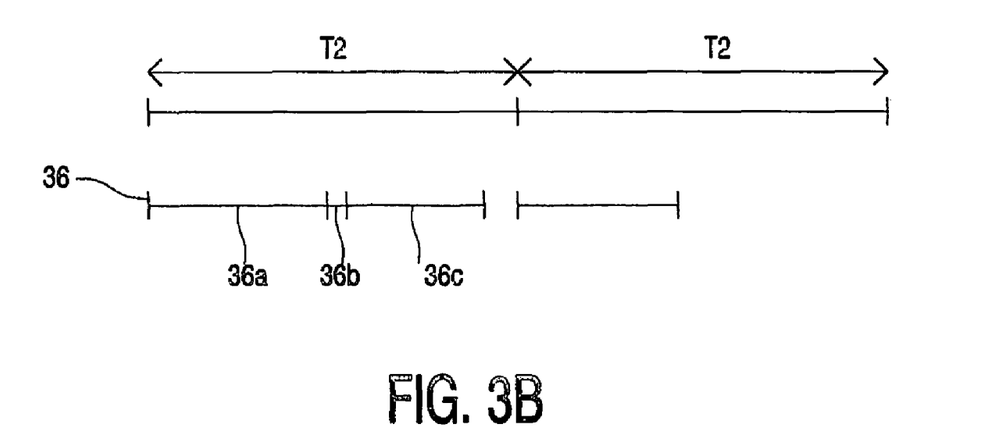
Figure 4:
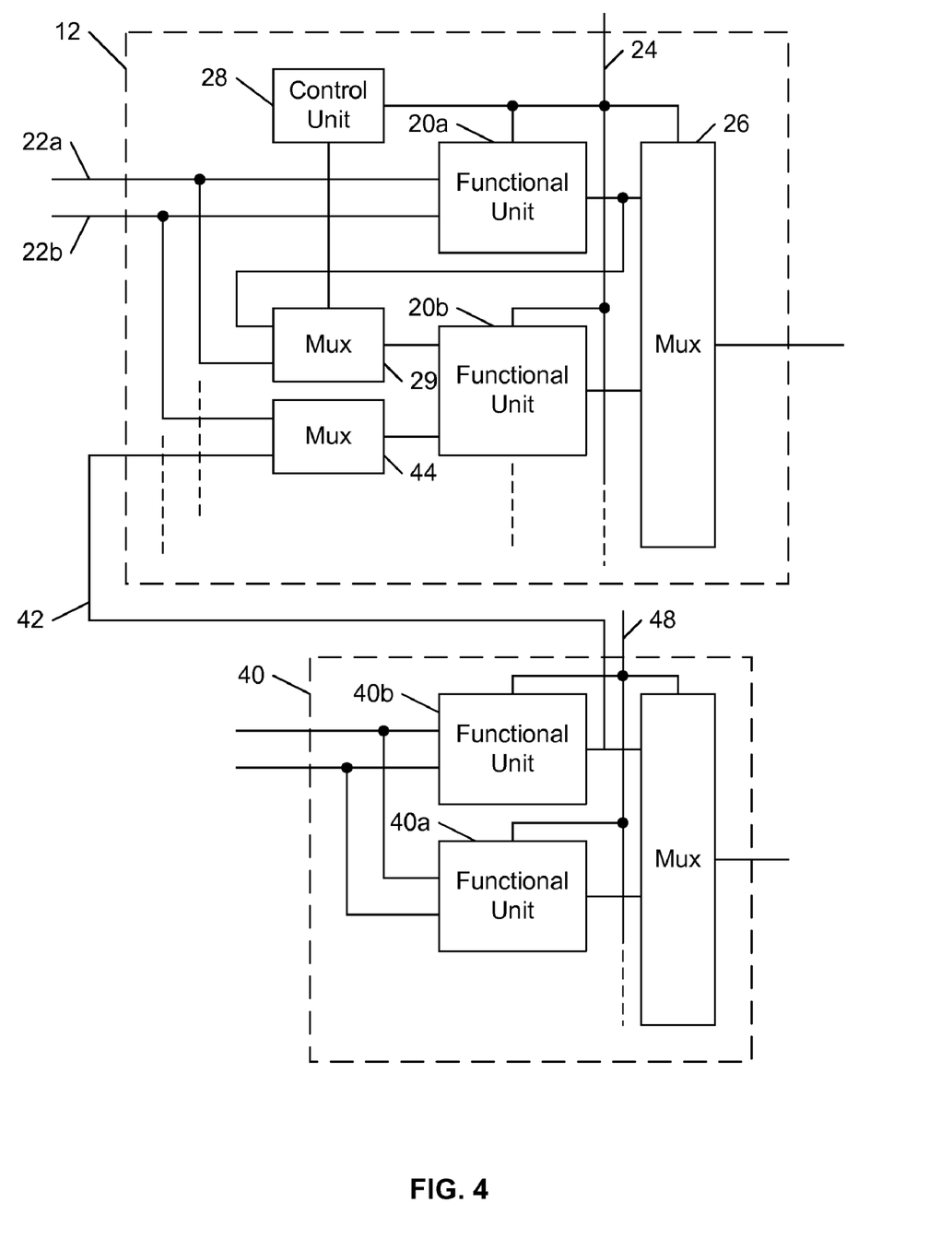
Figure 5:
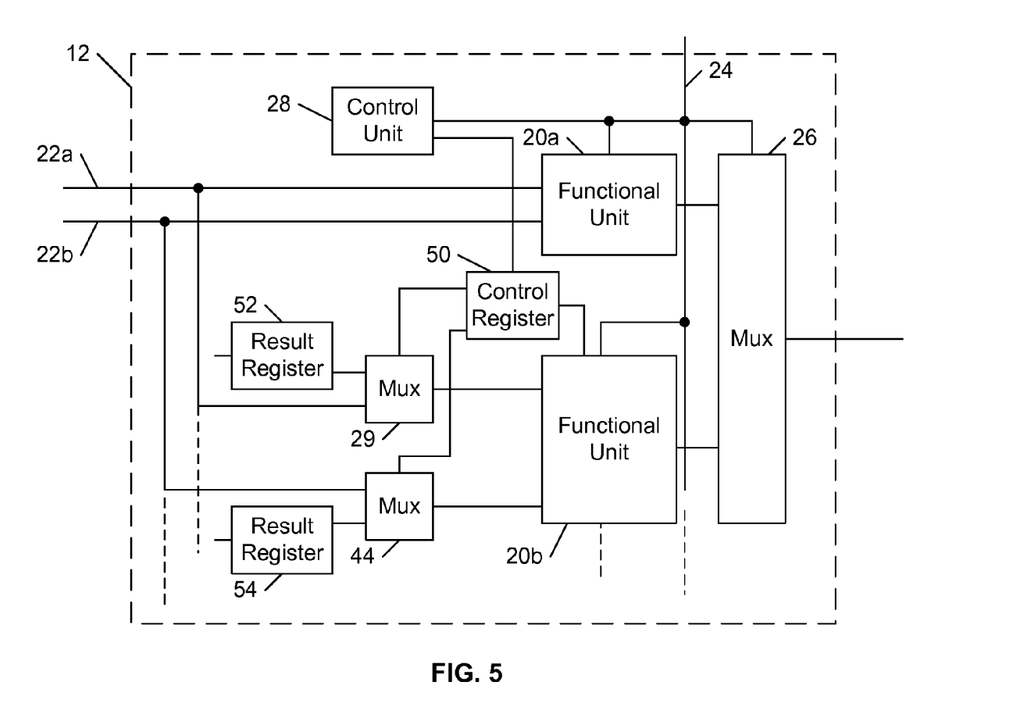

These and other objects and advantageous aspects of the invention will be described using the following figures FIG. 1 shows a processing device FIG. 2 shows a group of functional units FIGS. 3a,b show timing aspects FIG. 4 shows a plurality of groups of functional units FIG. 5 shows a further group of functional units FIG. 1 shows a processing device comprising an instruction memory 17, an instruction issue unit 10, with an issue slot 11, a group of functional units 12, a register file 14, a clock circuit 16, a clock rate selection circuit 18 and a program counter 19. Program counter 19 has an output coupled to an address input of instruction memory 17. Instruction memory 17 has an output coupled to instruction issue unit 10. Issue slot 11 of instruction issue unit 10 contains outputs for an operation code coupled to group of functional units 12 and a first operand register address and a second operand register address and a result register address coupled to register file 14. Group of functional units 12 has operand inputs coupled to outputs of register file 14 and a result output coupled to an input of register file 14.

Although only one group of functional units 12 is shown, it should be understood that a plurality of groups may be present in parallel. In this case instruction issue unit contains a respective issue slot for each group of functional units, with an output coupled to an operation code input of the relevant group and register address outputs coupled to register file 14. Also in this case register file 14 has a separate result input for each group of functional units, as well as a separate operand output.

Clock rate selection circuit 18 has an output coupled to a control input of clock circuit 16 and program counter 19. Clock circuit 16 has a clock output coupled to instruction issue unit 10 and register file 14. Instruction issue unit 10 is coupled to program counter 19. In operation a clock signal from clock circuit 16 defines successive instruction cycles. Normally a respective instruction is executed in each instruction cycle. In each instruction cycle instruction issue unit 10 issues an operation code of a command that is part of an instruction to group of functional units 12. Similarly, instruction issue unit 10 issues operand register addresses for an instruction to register file 14 in each instruction cycle and instruction issue unit 10 issues a result register address for an instruction to register file 14 in each instruction cycle. Due to pipelining, the operation code, operand register addresses and result register address that are issued in the same instruction cycle may belong to different instructions.

In an instruction cycle group of functional units 12 executes a command identified by the operation ode from instruction issue unit 10, using one or more operands received from register file 14.

FIG. 2 shows group of functional units 12 in more detail. Group 12 contains a plurality of functional units 20$a,b$ (only two shown for the sake of clarity, but more may be present). Operand inputs 22$a,b$ of group 12 are coupled to operand inputs of functional units 20$a,b$. Result outputs of functional units 20$a,b$ are coupled to a result output of group 12 via an output multiplexer 26. An operation code input 24 is coupled to operation code inputs of functional units 20$a,b$ and output multiplexer 26 (preferably operation code 24 is coupled to functional units 20$a,b$ and output multiplexer 26 via a predecoder, but this is not shown for the sake of clarity).

Group 12 also contains a control unit 28 and an input multiplexer 29. Input multiplexer 29 has a first input coupled to operand input 22$a$ of the group and an output coupled to an operand input of a second functional unit 20$b$. A second input of input multiplexer 29 is coupled to a result output of a first functional unit 20$a$ Control unit 28 is coupled to operation code input 24 and has an output coupled to a selection input of input multiplexer 29.

In operation, received operation codes of a first type each identify one of the functional units 20$a,b$ which executes the operation code. For operation codes of this first type control unit 28 makes input multiplexer 29 pass the operand from operand input 22$b$. The identified functional unit 20$a,b$ executes a processing operation (for example ADD, or Multiply) identified by the operation code, using the operands applied to its operand inputs. The identified functional unit 20$a,b$ outputs a result. Output multiplexer 26 passes the result from the identified functional unit 20$a,b$ to the result output of the group of functional units 12.

FIG. 3$a$ shows timing aspects of execution of operations by functional units 20$a,b$. On top a trace 30 indicates successive instruction cycles. Each instruction cycle lasts for a duration of T1. Below the top line minimum time intervals 32, 34 have been indicated that are needed by functional units 20$a,b$ to produce results during execution. Time intervals 32, 34 may depend on the kind of operation that is selected by the operation code, on the functional unit 20$a,b$ that executes the operation and the operand data used in the operation. However, the result is always available before the end of the instruction cycle, i.e. the duration of the intervals is shorter than T1. It should be noted that FIG. 3$a$ only shows intervals needed for execution in a functional unit. In practice, operation may be pipelined, so that processing of each instruction involves an instruction fetch stage, an operand fetch stage, an execution stage and a result write stage, the different stages being executed in successive instruction cycles, if need be after latching intermediate results. Time intervals 32, 34 concern only the execution stage.

The operation codes also include operation codes of a second type, which result in operation of a cascade of functional units 20$a,b$. When an operation code of the second type is applied to operand input 24, control unit makes input multiplexer 29 pass a result from a first one of the functional units 20$a$ to an operand input of a second one of the functional units 20$b$. Output multiplexer 26 passes the result from second one of the functional units 20$b$ to the result output of group of functional units 12.

As an example of an operation code of the second type is an operation code for the computation of an operand to a sum of a square result=$A*A+B$ In this example, first functional unit 20$a$ of group 12 is a multiplier and second functional unit 20$b$ of group 12 is an adder. The operation has the register addresses of registers that contain A and B as operands. In response to the operation code first functional unit 20$a$ of group 12 forms the product $A*A$. In response to the same operation code control unit 28 causes multiplexer 29 to pass the products $A*A$ as operand to second functional unit 20$b$ of group 12. Still in response to the same operation code second functional unit 20$b$ of group 12 forms a sum $A*A+B$ of the received products $A*A$ and the operand B. It should be appreciated that this operation code is merely an example. Operation codes may be provided for other operations (e.g. $A*A-B$, $A/((A+B)$, etc. $A*B+A$), a single such operation code may be supported or a plurality.

When more operands are available either through inclusion of more than two operand register addresses in a command, or through inclusion of more than one operand in the same register, more complicated operations may be executed. E.g. when operands contain pairs of numbers (ReA,ImA) and (ReB,ImB) that each represent the real part and the imaginary part of a complex number, a combination operation may instruct multiplier functional units to form products of the real parts (ReA*ReB) and of the imaginary parts (ImA*ImB) respectively and an adder to sum the products. In this case, group 12 preferably contains at least two multipliers and an adder as functional units, as well as multiplexers under control of control unit 28 to select whether the adder receives operands from operand inputs 22$a,b$ or from the multipliers.

FIG. 3$b$ shows timing aspects of the execution stag of execution of an operation selected by an operation code of the second type. In this case, the duration of instruction cycles is T2. The duration of time interval 36 needed before a result of this operation is available is a sum of a duration of a first time interval 36a needed by the first one of the functional units 20a, a duration of a second time interval 36b needed to pass the result of the first one of the functional units 20a to the operand input of the second one of the functional units 20b and a duration of a third time interval 36c needed by the second one of the functional units 20b (To be more precise, instead of the duration of second time interval 36b one should consider a difference between the duration of the time interval needed to pass the result from the output of the first one of the functional units 20a to the operand input of the second one of the functional units 20b minus the duration of the interval needed to pass an external operand to this operand input; this difference may be negative).

The overall duration of the interval 36 before the result of an operation of the second type is available is longer than the duration of the intervals 36a, 36c needed by the functional units 20a,b for the operations of which the operation is made up. Nevertheless this overall duration should fit within the duration T2 of an instruction cycle.

Clock rate selection circuit 18 supplies a signal to clock circuit 16 to select the clock rate, i.e. the duration T1 or T2 of the instruction cycle. Preferably, the clock rate is set as low as possible (to an instruction cycle duration that is as long as possible) without compromising the ability to executed of required tasks within a required time-interval. By reducing the clock rate power consumption of the device is reduced.

The selectable clock rates include a slow clock rate at which the duration execution of instructions of the second type fits within an instruction cycle (duration T2) and a fast clock rate at which the duration execution of instructions of the second type does not fit within an instruction cycle (duration T1). When the clock rate is set at the slow clock rate a task is executed using instructions with operation codes of the second type. When the clock rate is set at the fast clock rate the task is executed without using instructions with operation codes of the second type, e.g. by replacing each instruction with an operation code of the second type by more than one instruction with an operation code of the first type. By using instructions with operation codes of the second type at the slow clock rate the number of instruction cycles needed to execute a task is reduced. Thereby execution speed is increased.

Any way of adapting the instructions employed in executing the task may be used. In one embodiment, instruction memory 17 stores instructions of at least two programs for executing the same task, one using instructions with operation codes of the first type and another one not using such instructions. In this embodiment clock rate selection circuit 18 selects the relevant program in addition to the clock rate, for example by setting the initial value of program counter 19 at the start of execution of the task.

However, many other ways may be used to avoid the use of operation codes of the second type during execution of the task. For example, instructions may be executed to jump to either a program with operation codes of the second type or without this type of operation codes, dependent on the clock rate that has been set. Similarly, translation of instruction addresses into physical memory addresses may be made dependent on the selected clock rate so as to select the appropriate instructions. In these cases it is not necessary to provide alternative versions (with and without operation codes of the second type) of the whole program for executing a task: instead alternative versions may be provided only for sections of the program that contain such instructions (in this case instructions with operation codes of the second type are preferably included only in frequently executed sections). As an alternative instruction issue unit may even be arranged to translate an instruction with an operation code of the second type into a plurality of instructions without such operation codes on the fly, if the fast clock rate has been selected.

Preferably the operation codes of the second type support frequently executed instructions.

Although the invention has been illustrated by means of an embodiment with a clock rate selection circuit 18, it will be understood that the clock rate may be selected in other ways, for example under control of the part of the program counter value, so that the clock rate is set dependent on the segment of a program from which instructions are being executed, or under control of instructions from the program.

FIG. 2 illustrates an embodiment in which several functional units 20a,b respond to the same operation code of the second type. In addition control unit 28 responds to this operation code and output multiplexer 26 outputs a result from only one of the responding functional units 20a,b. However, it will be understood that a (pre-)decoder (not shown) may used that detects which functional units must be activated in response to an operation code and that activates these functional units 20a,b. In this case the (pre-)decoder activates one functional unit 20a,b per instruction cycle when the operation code is of the first type and a combination of functional units when the operation code is of the second type. As shown, each of the functional units 20a,b that is activated in response to the operation code of the second type is also able to respond individually to an operation code of the first type. Thus, instruction units 20a,b are efficiently reused. However, in an alternative, a part of the functional units 20a,b that is used to execute an operation code of the second type in cascade may be of a type that does not respond individually to any operation code of the first type. Thus a certain overhead has to be introduced into the group of functional units 12.

Although only a single input multiplexer 29 is shown by way of example, and only two functional units 20a,b, it will be understood that in practice more complicated connection networks may be provided between the outputs of functional units 20a,b or additional function units (not shown) in group 12.

FIG. 4 shows two groups 12, 40 of functional units for use in a processing device as shown in FIG. 1, implementing a further aspect of the invention. Each of the groups 12, 40 has an operation selection input 24, 48 coupled to a respective issue slot from the instruction issue unit (not shown), and to read and write ports of the register file (not shown). Thus, the device is a VLIW processor (Very Long Instruction Word processor) that contains multiple, substantially independently selectable commands for different groups 12, 40. A first one of the groups 12 is arranged as shown in FIG. 2, except that a further multiplexer 44 has been added, to a first input of which the second operand input 22b of group 12 is coupled. An output of further multiplexer 44 is coupled to an operand input of second functional unit 20b. Further multiplexer 44 has a control input coupled to control unit 28.

A second group of functional units 40 contains a number of functional units 40a, 40b. The output of one of the functional units 40b of second group 40 is coupled to a second input of further multiplexer 44 via a bypass connection 42.

In operation control unit 28 recognizes when the operation code of a combination instruction is issued to group of functional units 12. If so, control unit 28 causes multiplexers 29, 44 to pass operands from the first functional unit 20a of group 12 and from functional unit 40b of further group 40 to the operand inputs of second functional unit 20b of group 12.

Both first and second functional unit 20a,b of group 12 respond to the combination instruction, first functional unit 20a receiving operands from the operand inputs 22a,b of group 12, multiplexer 26 passing the result from second functional unit 20b to the write port of register file that is provided for group 12.

A program stored in instruction memory 17 contains an instruction that contains commands for both groups 12, 40. The instruction contains a combination command for a first group 12 and the command for the second group 40 contains an operation code that activates second functional unit 40b of the second group. Thus, in response to the instruction, both first functional unit 20a of first group 12 and second functional unit 40h of second group 40 produce results that are used as operands by second functional unit 20b of group 12. The result from second functional unit 40b of second group 40 is passed between the groups 12, 40 via bypass connection 42. Multiplexers 29, 44 pass the results as operands to second functional unit 20b of first group 12.

As an example, this type of instruction may be used for a multiply-add operation in which the products of two pairs of operands are added $$result = A*B + C*D$$

In this example, first functional unit 20a of first group 12 is a multiplier, second functional unit 40b of second group 40 is a multiplier and a second functional unit 20b of first group 12 is an adder. The instruction contains a multiply-add command (the combination command) that is issued to first group 12 and a multiply command that is issued to second group 40. The multiply-add command has the register addresses of registers that contain A and B as operands and the multiply command has the addresses of registers that contain C and D as operands. In response to the instruction first functional unit 20a of first group 12 and second functional unit 40b of second group 40 form the product A*B and C*D respectively. In response to the same multiply-add instruction control unit 28 causes multiplexers 29, 44 to pass these products as operands to second functional unit 20b of first group 12. Still in response to the same multiply-add instruction second functional unit 20b of first group 12 forms a sum A*B+C*D of the received products A*B and C*D.

This type of combined multiplication and addition is a frequently occurring combination of instructions, for example in multiplication of complex numbers and therefore the instruction realizes considerable savings in the number of instructions that need to be issued for this type of operation. However, it should be realized that the invention is not limited to this instruction. For example, a similar technique could be applied to multiplication and subtraction, to compute A*B-C*D, or to any other combination of operations that occurs in certain program. The device may support an operation code for one combination instruction only or for a plurality of such instructions.

It should be noted that, when executing a program with the functional units of the embodiment of FIG. 4, when the instruction cycle rate is too fast to accommodate the delays of second functional unit 40b of second group 40 and second functional unit 20b of first group 12 in succession, the program may be adapted so as to eliminate combination instructions, as discussed in the contest of FIG. 2. The combination instruction may provide for selection of results from different functional units (alternative to second functional unit 40b of second group 40) for use as operand for second functional unit 20b of first group 12. These different functional units may be part of a single group 40 or of a plurality of different groups. Without deviating from the invention second group 40 may contain only one functional unit (second functional unit 40b).

FIG. 5 shows an alternative group of functional units 12 for use in the device. In the embodiments show this far, the combination operation is executed in a single instruction cycle. In the embodiment of FIG. 5 multiple instruction cycles are used. Group of functional units 12 contains a control register 50 with an input coupled to control unit 28 and outputs coupled to control inputs of multiplexers 29, 44 and second functional unit 20b. First data inputs of multiplexers 29, 44 are connected to operand inputs 22a,b. Result registers 52, 54 are provided with outputs coupled to second data inputs of multiplexers 29, 44. Inputs of result registers 52, 54 are coupled to the result outputs of one or more functional units (e.g. 20a) in group 12 and/or to the result outputs of one or more functional in other groups (not shown). The input connections are not shown for the sake of clarity.

In operation, control unit 28 responds to a combination instruction issued for execution in a first instruction cycle by causing control register 50 to load information for controlling multiplexers 29, 44 and second functional unit 20b of first group 12. This information controls multiplexers 29, 44 and second functional unit 20b of first group 12 in a second instruction cycle that follows the first instruction cycle. In the second instruction cycle results latched in result registers 52, 54 are passed as operands to second functional unit 20b of group 12 and this second functional unit 20b receives a control signal to execute its part of the command implied by the combination instruction in the second instruction cycle. In response second functional unit 20b produces a result at the end of the second instruction cycle.

In this way a next instruction can be executed in group 12 in the second instruction cycle, in parallel with execution of part of the combination instruction by second functional unit 20b. For example, execution of a first instruction to compute A*B-C*D could be started in a first instruction cycle and a second instruction to compute A*D+B*C could be started in the next instruction cycle. Thus, the real and imaginary parts of two numbers A+iC and B+iD are computed using two instructions.

Of course it should be avoided that a conflict occurs between the results from both the combination instruction and the next instruction. This may be realized in various ways. In one embodiment the next instruction is selected from a subset of instructions that do not produce a result in the second instruction cycle (e.g. another combination instruction, or a NOP instruction). In this embodiment control register 50 also controls output multiplexer 26 to pass the result from second functional unit 20b. In another embodiment a bypass register (not shown) may be used to pass the result of second functional unit 20b in parallel with the result from the functional unit that responds to the next instruction.

It should be noted that in the embodiment of FIG. 5 the program need not be adapted when the instruction cycle rate is too fast to accommodate the delays of the first and second functional unit 20a,b in a single instruction cycle.

Although FIG. 5 shows result registers 52, 54 inserted before multiplexers 29, 44, these registers 52, 54 may be omitted if wave pipelining is used. In this case propagation delays within the functional units 20a,b are used to allow results from the combination instruction and the next instruction to be present simultaneously at the outputs of second functional unit 20b and the functional unit that executes the next instruction. In a further embodiment registers may be provided in front of the particular functional units that produce the results used by second functional unit 20b of first group 12. These registers are arranged to respond to the combination instruction by latch the operands of these functional units and to supply these operands, after the operands have been applied directly from inputs 22a,b in a first instruction cycle, to the particular functional units also during a subsequent instruction cycle.

Although the invention has been illustrated using combination instructions involving successive execution of two functional units in series in response to the same command, it will be understood that combination commands may be provided involving a greater number of functional units in series.

The invention claimed is:

1. An instruction controlled data processing device comprising:
   an instruction issue unit that is configured to issue respective ones of instructions of program code in successive instruction cycles, the instructions including at least a first type of instruction and a second type of instruction;
   a clocking circuit that is configured to clock the instruction cycles;
   a register file with a read port and a write port;
   a plurality of functional units, each functional unit having a control input coupled to the issue unit, an operand input coupled to the read port and a result output coupled to the write port; and
   a control unit coupled to the issue unit, that is configured to route the result output of a first functional unit to the write port of the register file in response to instructions of the first type, and to the operand input of a second functional unit during an instruction cycle in response to instructions of the second type;
   wherein the clock circuit is configured to vary a rate of clocking the instruction cycles in dependence upon whether a current segment of the program code includes one or more instructions of the second type.

2. The processing device of claim 1, organized as a VLIW processor, wherein the issue unit includes a plurality of issue slots for issuing a VLIW instruction word, the register file having a plurality of sets of read and write ports, the functional units or groups of functional units each coupled to a respective one of the issue slots and the sets of read and write ports.

3. The processing device of claim 1, wherein the clock circuit includes a plurality of selectable clock rates, including a first clock rate that is sufficiently slow to accommodate a latency of instructions of the second type involved in producing a result from the second functional unit during execution of the instruction of the second type within the instruction cycle, and a second clock rate that is too fast to accommodate the latency of instructions of the second type in the instruction cycle, but accommodates latency of instructions of the first type.

4. The processing device of claim 1, wherein the control unit is configured to selectively route the result output of a third functional unit to a further operand input of the second functional unit under control of the instruction of the second type.

5. The processing device of claim 4, wherein the program code includes a VLIW instruction that contains a command for the third functional unit and the instruction of the second type for issue in a same instruction cycle.

6. The processing device of claim 1, wherein the control unit is arranged to make the second functional unit respond to the instruction of the second type in an instruction execution cycle following an instruction execution cycle in which the first functional unit responds to the instruction of the second type.

7. The processing device of claim 6, wherein the result of the first functional unit is routed without intermediate latching from the first functional unit to the operand input of the second functional unit.

8. A method of executing a processing task, comprising:
   providing a plurality of functional units,
   issuing successive instructions at an instruction cycle rate;
   executing those of the instructions that are of a first type each with an individual one of the functional units during one instruction cycle,
   executing an instruction that is of a second type with a first and a second one of the functional units in series during one instruction cycle;
   routing a result of the first one of the functional units to an operand of the second one of the functional units in response to the instruction of the second type; and
   selecting the instruction cycle rate from at least a first and second rate, based on the type of instruction, the first rate being so slow that execution of instructions of the second type by a cascade of at least two of the functional units fits within an instruction cycle at the first rate, the second rate being so fast that only execution of instructions of the first type fits within the instruction cycle at the second rate, execution of instructions of the second type not fitting within one instruction cycle at the second rate.

9. The method of claim 8, including
   issuing the successive instructions each as part of a VLIW instruction word that contains a plurality of instructions for respective further functional units;
   including in the instruction word that contains the instruction of the second type a further instruction for a particular one of the further functional units; and
   routing a further result of the further instruction from the particular one of the further functional units to a further operand input of the second one of the functional units in response to the instruction of the second type.

10. The method of claim 8, including adapting the instructions used to execute the processing task to the selected instruction cycle rate, so that the instructions of the second type are used when the task is executed at the first rate and the instructions of the second type are replaced by instructions of the first type with corresponding effect when the task is executed at the second rate.

* * * * *